United States Patent [19]

Rosthauser et al.

[11] Patent Number: 5,367,017

[45] Date of Patent: * Nov. 22, 1994

[54] AQUEOUS POLYUREA DISPERSIONS PREPARED BY AN EMULSION POLYMERIZATION PROCESS

[75] Inventors: James W. Rosthauser, Glendale; Robin E. Tirpak, Wheeling, both of W. Va.

[73] Assignee: Miles Inc., Pittsburgh, Pa.

[ * ] Notice: The portion of the term of this patent subsequent to May 18, 2010 has been disclaimed.

[21] Appl. No.: 877,686

[22] Filed: May 1, 1992

[51] Int. Cl.$^5$ ............ C08J 3/00; C08K 3/20; C08L 75/00
[52] U.S. Cl. .................... 524/589; 524/591; 524/839; 524/840; 524/874; 525/424; 528/61
[58] Field of Search ............... 524/589, 591, 839, 840, 524/874; 525/424; 528/61

[56] References Cited

U.S. PATENT DOCUMENTS

| | | | |
|---|---|---|---|
| 3,415,768 | 12/1968 | Dieterich et al. | 524/591 |
| 3,479,310 | 11/1969 | Dietrich et al. | 524/591 |
| 3,705,164 | 12/1972 | Honig et al. | 524/591 |
| 4,066,591 | 1/1978 | Scriven et al. | 260/29.2 TN |
| 4,251,401 | 2/1981 | Reischl | 524/591 |
| 4,408,008 | 10/1983 | Markusch | 524/591 |
| 5,212,230 | 5/1993 | Tirpak et al. | 524/839 |
| 5,236,994 | 8/1993 | Markusch et al. | 524/589 |

FOREIGN PATENT DOCUMENTS 44460 1/1982 European Pat. Off. ........... 524/591

*Primary Examiner*—Paul R. Michl
*Assistant Examiner*—P. Niland
*Attorney, Agent, or Firm*—Joseph C. Gil; Thomas W. Roy

[57] ABSTRACT

The present invention is directed to a aqueous polyurea dispersion for the preparation of an aqueous polyurea dispersion by I) dispersing in water at an NCO:NH equivalent ratio of 0.5:1.0 to 2.0:1.0
  a) a polyisocyanate which has an average functionality of 1.5 to 4.0 and an isocyanate content of at least 12% by weight and
  b) a polyamine component containing
    i) 30 to 70 mole percent of a polyamine having at least two primary and/or secondary amino groups and a molecular weight of at least 1000 and
    ii) 30 to 70 mole percent of a polyamine having at least two primary and/or secondary amino groups, a molecular weight of less than 400 and at least one anionic or potential anionic group and
II) allowing the polyisocyanate and polyamine component to react to form an aqueous polyurea dispersion.

The present invention is also directed to the aqueous polyurea dispersion prepared by this aqueous polyurea dispersion.

16 Claims, No Drawings

AQUEOUS POLYUREA DISPERSIONS PREPARED BY AN EMULSION POLYMERIZATION PROCESS

BACKGROUND OF THE INVENTION

The present invention is directed to a process for the preparation of aqueous polyurea dispersions having improved stability in water by the emulsion polymerization process and to the aqueous polyurea dispersions prepared by this process.

Aqueous polyurethane dispersions are known and are generally prepared by reacting a polyisocyanate with a high molecular weight polyol and low molecular weight chain extender components including components which provide hydrophilicity to the polyurethane. In these known processes, the polyisocyanate is initially reacted with the high molecular weight polyol to form an NCO prepolymer either in the melt or in the presence of an organic solvent prior to the introduction of water.

In U.S. Pat. No. 3,479,310 the NCO prepolymer is chain extended to form a linear polyurethane which is then mixed with an organic solvent prior to the addition of water. In U.S. Pat. Nos. 4,066,591 and 4,408,008 the NCO prepolymers are mixed with a solvent, dispersed in water and then chain extended with low molecular weight polyamines.

Accordingly, even though the chain extension step may be conducted in either the organic or the aqueous phase, the reaction between the polyisocyanate and the high molecular weight polyol is not conducted in the presence of water in either process. Further, in both processes organic solvents are necessary to reduce the viscosity of the fully reacted polyurethane or the NCO prepolymer prior to dispersing them in water.

An object of copending application, U.S. Ser. No. 07/677,011, filed Mar. 28, 1991 now U.S. Pat. No. 5,212,230, was to provide a method for preparing aqueous polymer dispersions which did not require the use of organic solvents to reduce the viscosity of fully reacted polyurethanes or NCO prepolymers and which could be conducted using readily available, simple mixing equipment. In accordance with this application an aqueous polyurea dispersion was prepared by emulsion polymerization, i.e., a polyisocyanate was dispersed in water and subsequently reacted with a high molecular weight polyamine. In this manner the need for solvents to disperse NCO prepolymer or fully reacted polyurethanes was avoided.

One of the disadvantages of this process is that the polyurea dispersions do not remain stable for more than a few hours. This becomes a problem if the dispersions cannot be prepared at the site where they will be used, which is often the case.

Accordingly, it is an object of the present invention to provide aqueous polyurea dispersions which possess improved storage stability without sacrificing any of the valuable properties provided by the aqueous polyurea dispersions described in the copending application. It should be possible to prepare these dispersions which remain stable in storage until they are ultimately used for their intended purpose.

Surprisingly, this object can be achieved in accordance with the present invention as set forth hereinafter.

SUMMARY OF THE INVENTION

The present invention is directed to a process for the preparation of an aqueous polyurea dispersion by
I) dispersing in water at an NCO:NH equivalent ratio of 0.5:1.0 to 2.0:1.0
  a) a polyisocyanate which has an average functionality of 1.5 to 4.0 and an isocyanate content of at least 12% by weight and
  b) a polyamine component containing
    i) 30 to 70 mole percent of a polyamine having at least two primary and/or secondary amino groups and a molecular weight of at least 1000 and
    ii) 30 to 70 mole percent of a polyamine having at least two primary and/or secondary amino groups, a molecular weight of less than 400 and at least one anionic or potential anionic group and
II) allowing the polyisocyanate and polyamine component to react to form an aqueous polyurea dispersion.

The present invention is also directed to the aqueous polyurea dispersion prepared by this process.

DETAILED DESCRIPTION OF THE INVENTION

In accordance with the present invention a "polyurea" is understood to mean a polymer containing urea groups and optionally urethane groups.

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water in the absence of large quantities of organic solvents, even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethyl-5-isocyanatomethyl cyclohexane (isophorone diisocyanate), 2,4-and/or 2,6-hexahydrotoluylene diisocyanate, hexahydro-1,3-and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or they may be rendered hydrophilic by admixture with external emulsifiers or by reaction with nonionic compounds containing isocyanate-reactive groups. The reaction components which ensure the dispersibility of the polyisocyanates include compounds containing lateral or terminal, hydrophilic ethylene oxide units.

Less preferred for providing hydrophilicity are compounds containing anionic or potential anionic groups, such as diols containing such groups. In accordance with the present invention anionic groups are incorporated into the aqueous polyurea dispersions after the polyisocyanate has been dispersed in water during the emulsion polymerization to provide additional storage stability. Accordingly, it is only necessary according to the invention to incorporate sufficient hydrophilicity into the polyisocyanates to enable them to be dispersed in water in the absence of solvents. It is not necessary to incorporate into the polyisocyanates sufficient hydrophilicity to enable the resulting aqueous polyurea dispersions to remain stably dispersed in water.

The reason for this is that the molecular weight and, thus, the viscosity of the polyisocyanate increases because of the incorporation of hydrophilic groups. If all of the hydrophilicity which is necessary for the aqueous polyurea dispersion to remain stably dispersed in water is incorporated into the polyisocyanate, then its viscosity may require the use of an organic solvent to disperse it in water.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate.

Hydrophilic components having terminal or lateral hydrophilic chains containing ethylene oxide units include compounds corresponding to the formulae H—Z—X—Y—R″ or

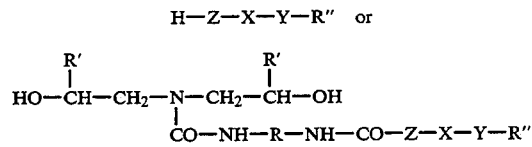

wherein
R represents a difunctional radical obtained by removing the isocyanate groups from a diisocyanate corresponding to those previously set forth, R′ represents hydrogen or a monovalent hydrocarbon radical containing from 1 to 8 carbon atoms, preferably hydrogen or a methyl group, R″ represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR‴- wherein R‴ has the same definition as R″ and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing anionic groups or potential anionic groups for providing sufficient hydrophilicity to the polyisocyanates to enable them to be dispersed in water include carboxylate groups and sulphonate groups. The anionic groups are formed by neutralizing the corresponding potential anionic groups (free acid groups) either prior to, during or after their reaction with the polyisocyanate. When the potential anionic groups are neutralized prior to reaction with the polyisocyanate, anionic groups are incorporated directly. When neutralization is performed subsequent to reaction with the polyisocyanate, potential anionic groups are incorporated. Suitable compounds for incorporating the previously discussed carboxylate and sulphonate groups are described in U.S. Pat. Nos. 3,479,310, 4,108,814, and 3,412,054, the disclosures of which are herein incorporated by reference.

In addition to the previously discussed hydrophilic modifiers, which are chemically incorporated into the polyisocyanates, it is also possible to use external emulsifiers which may be anionic or nonionic. Further, when the polyisocyanate has a sufficiently low viscosity, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water have a functionality of 1.5 to 4.0, preferably 1.8 to 3.0. When dispersion stability is a specific requirement, the polyisocyanates preferably have a functionality of 1.5 to 2.5, more preferably 1.8 to 2.2. These modified polyisocyanates may be obtained by reacting polyisocyanates with monofunctional compounds, optionally containing hydrophilic groups, to obtain polyisocyanates having functionalities within these ranges. The reaction of the polyisocyanates with monofunctional compounds containing hydrophilic groups improves the stability of the aqueous polyurea dispersions but can limit their molecular weight, especially when the functionality is reduced below 2. It is also possible to reduce the functionalities of polyisocyanates by reacting them with monofunctional compounds which do not contain hydrophilic groups (such as low molecular weight monoalcohols).

The polyisocyanates to be dispersed in water preferably have a functionality of at least 2, more preferably at least 2.2. These compounds may also be prepared by reacting polyisocyanates having functionalities of greater than 2 with monofunctional compounds, optionally containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2, thereby limiting the molecular weight of the aqueous polyurea dispersions.

In accordance with the present invention it is possible to obtain dispersion stability and to ensure that the aqueous polyurea dispersions achieve a sufficiently high molecular weight, by controlling the functionality of the component containing hydrophilic groups and the functionality of the polyisocyanate.

The polyisocyanate dispersions generally have a solids content of about 2 to 50, preferably about 10 to 30 weight percent.

After the polyisocyanates have been dispersed in water, they are chain extended with a polyamine mixture. Component i) of the mixture is a polyamine having two or more, preferably 2 to 4, primary and/or secondary amino groups and a molecular weight of at least 1000, preferably 1000 to 5000 and more preferably 1200 to 3000. In cases where the functionality of the polyisocyanate is greater than 2.5, it may be necessary to replace a portion of the polyamine with a monamine to improve dispersion stability. The amino groups may be aliphatically-, cycloaliphatically-, araliphatically- or aromatically-bound.

Suitable polyamines include those obtained by hydrolyzing NCO prepolymers having isocyanate group contents of 0.5 to 40% by weight. Preferably, these polyamines are prepared by initially reacting a polyether containing two to four hydroxyl groups with an excess of a polyisocyanate to form an NCO prepolymer and then converting the isocyanate groups to amine groups by hydrolysis. Processes for the production of useful polyamines via isocyanate hydrolysis techniques are known and are described in U.S. Pat. Nos. 4,386,318, 4,456,730, 4,472,568, 4,501,873, 4,515,923, 4,525,534, 4,540,720, 4,578,500 and 4,565,645, European Patent 0,097,299 and German Offenlegungsschrift 3,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595. In the event that a basic material is used during the hydrolysis of the amine which would act as a trimerization catalyst, and if that basic material is not removed once the hydrolysis reaction is complete, then an acidic material, such as benzoyl chloride, should be added either before or shortly after the polyamine and polyisocyanate are admixed.

Also useful are compounds prepared by reacting the corresponding polyol with a halogenated nitrobenzene compound such as o- or p-nitrochlorobenzene, or dinitrochlorobenzene, followed by the reduction of the nitro group(s) to the amine, as described in U.S. application Ser. No. 07/183,556, filed on Apr. 19, 1988 and in published European Patent Application 0,268,849, published Jun. 1, 1988. Also useful are the polyamines prepared by reacting a polyol with an acetoacetate and thereafter with an amine as described in U.S. application Ser. No. 07/523,769 and U.S. Pat. No. 5,066,824, the disclosures of which are herein incorporated by reference.

Instead of, or, in addition to the high molecular weight amines noted above, polyoxyalkylene polyamines may be used. Such polyamines are known in the art. One method for preparing such amines is the amination of polyhydroxy polyethers (e.g., polypropylene glycols) by a reaction with ammonia in the presence of Raney nickel and hydrogen (Belgian patent 634,741). U.S. Pat. No. 3,654,370 discloses the preparation of polyoxyalkylene polyamines by the reaction of the corresponding polyol with ammonia and hydrogen in the presence of a nickel, copper, or chromium catalyst. The preparation of polyethers containing amino end groups by the hydrogenation of cyanoethylated polyoxyalkylene ethers is described in German Patent 1,193,671. Other methods of preparation of polyoxyalkylene polyamines are described in U.S. Pat. Nos. 3,155,728 and 3,236,895, and French Patent 1,551,605. Commercially available polyether polyamines are sold by Texaco under the Jeffamine tradename.

Component ii) of the polyamine mixture is present to provide additional hydrophilicity to the aqueous polyurea dispersion. Suitable compounds include those having two or more, preferably 2 to 4, primary and/or secondary amino groups, a molecular weight of less than 400, and at least one anionic group. Suitable anionic groups are sulfonate and carboxylate groups, preferably sulfonate groups. Amino sulfonates and amino carboxylates are disclosed in U.S. Pat. No. 4,379,410, the disclosure of which has previously been incorporated by reference.

Preferred amino sulfonates are those corresponding to the formula

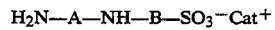

wherein
A and B represent aliphatic hydrocarbon radicals having 2 to 6 carbon atoms, preferably ethylene radicals and Cat+ represents an alkali metal or optionally substituted ammonium cation, preferably a sodium or potassium cation and more preferably a sodium cation.

As previously discussed with regard to the optional incorporation of potential anionic groups into the polyisocyanate component, it is also possible to use compounds containing potential anionic groups as component ii). For example, amino sulfonic or carboxylic acids may be blended with water prior to neutralization of the acid groups. The neutralizing agent may be present in water at the time of dispersion or may be added shortly thereafter. If the polyisocyanate component is already present in water at the time of addition of component ii), it is preferred that the neutralizing agent be present in the water at the time of dispersion. More preferably, component ii) contains anionic groups before it is added to water when the polyisocyanate component has previously been added.

Component i) is present in an amount of 30 to 70 mole percent, preferably 35 to 60 mole percent and more preferably 40 to 55 mole percent, based on the total moles of the amine mixture. Component ii) is present in an amount of 30 to 70 mole percent, preferably 40 to 65 mole percent and more preferably 45 to 60 mole percent, based on the total moles of the amine mixture.

In addition, to components i) and ii), it is also possible to include 1 to 25%, preferably 2 to 20% by weight, based on the combined weights of components i) and ii), of a polyamine which has a molecular weight of less than 400 and does not contain anionic or potential anionic groups. These polyamines are known and disclosed in U.S. Pat. No. 4,701,480, the disclosure of which is herein incorporated by reference.

In order to prepare the aqueous polyurea dispersions according to the present invention, the components of the polyamine mixture may be added to the water separately or in admixture either before, during or after the polyisocyanate has been dispersed. Preferably, the polyamine components are mixed together before being added to water. When a hydrophobic polyamine is added to water either before or after, preferably before, the addition of the polyisocyanate, it may be necessary to add a small amount of an external emulsifier, i.e., up to about 10%, based on the weight of the polyamine, in order to maintain the polyamine stably dispersed, e.g., during the introduction of the polyisocyanate. If the polyisocyanate is added to water prior to the addition of the polyamine components or if the polyamine contains chemically incorporated hydrophilic groups, e.g., when using amines prepared from NCO prepolymers containing such hydrophilic groups, it may not be necessary to add an external emulsifier. It may also not be necessary to add an external emulsifier when the polyamine components are added to the water in admixture because the hydrophilicity of component ii) will assist the dispersion of component i). The polyisocyanate and polyamine components should not be admixed prior to being dispersed in water because they will immediately begin to react resulting in a rapid increase in viscosity before the mixture can be dispersed in water.

If the polyamine components are directly added to the dispersed polyisocyanate, it is possible that they will react with the polyisocyanate before they have been dispersed throughout the mixture. This results in the formation of lumps or large particles in the dispersion. To avoid this problem it is preferred to mix the polyamine components with water before they are mixed with the dispersed polyisocyanate (an external emulsifier may also be present), in order to reduce the concentration of the polyamine and enable it to be more quickly mixed with the dispersed polyisocyanate.

The amount of the polyamine is chosen to provide an equivalent ratio of amino groups to isocyanate groups of the polyisocyanate of 0.5:1.0 to 2.0:1.0, preferably 0.7:1.0 to 1.5:1.0 and more preferably 0.9:1.0 to 1.1:1.0.

In accordance with the present invention, it is also possible to incorporate additives into the aqueous polyurea dispersions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous polyurea dispersions may be used in any of the applications previously disclosed for aqueous polyurethane or polyurethane-urea dispersions.

The invention is further illustrated but is not intended to be limited by the following examples in which all parts and percentages are by weight unless otherwise specified.

EXAMPLES

Example 1

Preparation of an aromatic, water dispersible polyisocyanate

A three liter round bottom flask equipped with a thermometer, drying tube, condenser, and stirrer was charged with 549 parts of Crude MDI[1] and 274.5 grams of a monofunctional poly(oxyethylene) ether[2]. The temperature of the reaction flask was increased to 70° C. The reaction proceeded at this temperature for four hours at which time the isocyanate content was determined by titration to be 20.42% (theoretical NCO=20.75%). The modified polyisocyanate was cooled to ambient temperature and placed in dry containers for later use.

1 An aniline/formaldehyde condensation product containing 4,4'-diphenylmethane diisocyanate and about 50% of higher functionality homologs and having an isocyanate content of about 31.5% and a viscosity at 25° C. of 200 mPa.s.

2 A polyether monohydric alcohol having a molecular weight of 2200 and prepared from n-butanol, ethylene oxide and propylene oxide (molar ratio of ethylene oxide to propylene oxide—83:17).

Example 2

Preparation of an Aqueous Polyurea Dispersion by Emulsion Polymerization 40 grams of the water-dispersible polyisocyanate of Example 1 were dispersed under agitation in a two liter resin flask containing 452.75 grams of demineralized water at ambient temperature. To the dispersed isocyanate was added a mixture of 15.65 grams of a 46% solution of the sodium salt of N-(2-aminoethyl)-2-aminoethanesulfonic acid dissolved in water, 86 grams of an amine-terminated polyoxypropylene glycol having a molecular weight of 2000 (Jeffamine D-2000, available from Texaco Chemical Company), 7.2 grams of an external emulsifier (Surfonic N-300, an ethoxylated nonyl phenol having a molecular weight of 1540 and available from Union Carbide Corporation), and 100.4 grams of demineralized water. The dispersion was then reacted for 2 hours at 70° C. and cooled to room temperature. The dispersion, which was free from isocyanate groups, had a viscosity of 10 mPa.s at 22° C. and a pH of 7.83. A film formed from the dispersion (drawn down 10 mils wet on glass) was cloudy, continuous, soft and elastic.

Example 3

Preparation of an Aromatic Water-Dispersible Diisocyanate

A one liter round bottom flask equipped with a thermometer, drying tube, condenser, and stirrer was charged with 510 parts of an isocyanate semi-prepolymer[3] and 70 parts of the monofunctional poly(oxyethylene) ether described in Example 1. The temperature of the reaction flask was increased to 70° C. The reaction proceeded at this temperature for three hours at which time the isocyanate content, determined by titration, was 19.4% (theoretical NCO=20.0%). The modified isocyanate semi-prepolymer was cooled to ambient temperature and placed in dry containers.

3 A diisocyanate semi-prepolymer prepared by reacting 4,4′diphenylmethane diisocyanate and tripropylene glycol in a molar ratio of about 5:1 to provide a product having an NCO content of about 23% and a viscosity at 25° C. of 725±175 mPa.s.

Example 4

Preparation of an Aqueous Polyurea Dispersion by Emulsion Polymerization 35 grams of the water-dispersible polyisocyanate of Example 3 were dispersed under agitation in a two liter resin flask containing 294.02 grams of demineralized water at ambient temperature. To the dispersed isocyanate was added a mixture of 13.5 grams of the 46% solution of the sodium salt of N-(2-aminoethyl)-2-amino-ethanesulfonic acid dissolved in water, 81.8 grams of the amine-terminated polyether described in Example 2, 6.5 grams of the external emulsifier described in Example 2, and 87.2 grams of demineralized water. The dispersion had a viscosity of 10 mPa.s at room temperature and a pH of 9.5. A film of the dispersion (drawn down 10 mils wet on glass) was cloudy, grainy, continuous, soft and tacky.

Example 5 (Comparison)

Preparation of an Aqueous Polyurea Dispersion by Emulsion Polymerization 36.8 grams of the water-dispersible polyisocyanate of Example 3 were dispersed under agitation in a two liter resin flask containing 365.51 grams of demineralized water at ambient temperature. To the dispersed isocyanate was added a mixture of 9.0 grams of a 46% solution of the sodium salt of N-(2-aminoethyl)-2-amino-ethanesulfonic acid dissolved in water, 118.1 grams of the amine-terminated polyether described in Example 2, 9.14 grams of the external emulsifier described in Example 2, and 125.4 grams of demineralized water. The dispersion contained course particles and spongy material that precipitated from the suspension within an hour. It had a viscosity of 10 mPa.s at room temperature and a pH of 8. A film of the material contained a much greater number of particles than the one described in Example 4.

Example 6

Preparation of an Aliphatic Water-Dispersible Polyisocyanate

A one liter round bottom flask equipped with a thermometer, drying tube, condenser and stirrer was charged with 675 grams of an isocyanurate group-containing polyisocyanate[4] and 175 grams of the monofunctional poly(oxyethylene) ether described in Example 1. The temperature of the reaction was increased to 100° C. The reaction proceeded at this temperature for four hours at which time the isocyanate content was determined by titration to be 16.3% (theoretical NCO=16.6%). The viscosity of the prepolymer was 3300 mPa.s at 25° C. The polyisocyanate was cooled to ambient temperature and placed in dry containers.

4 An isocyanurate group-containing polyisocyanate prepared by trimerizing a portion of the isocyanate groups of 1,6-hexamethylene diisocyanate and having an isocyanate content of 21.6% by weight, a content of monomeric diisocyanate of <0.2% and a viscosity at 20° C. of 3000 mPa.s.

Example 7

Preparation of an aqueous polyurea dispersion by emulsion polymerization 35 grams of the water-dispersible polyisocyanate of Example 6 were dispersed under agitation in a two liter resin flask containing 346.8 grams of demineralized water at ambient temperature. To the dispersed isocyanate was added a mixture of 14.0 grams of a 46% solution of the sodium salt of N-(2-aminoethyl)-2-amino-ethanesulfonic acid dissolved in water, 57.0 grams of the amine-terminated polyether described in Example 2, 5.2 grams the external emulsifier described in Example 2, and 60 grams of demineralized water. The dispersion had a viscosity of 10 mPa.s at 25° C. and a pH of 9.50. A film of the dispersion (drawn down 10 mils wet on glass) was cloudy, continuous, grainy and soft.

Example 8 (Comparison)

Preparation of an aqueous polyurea dispersion by emulsion polymerization 35 grams of the water-dispersible polyisocyanate of Example 6 were dispersed under agitation in a two liter resin flask containing 336.8 grams of demineralized water at ambient temperature. To the dispersed isocyanate was added a mixture of 2.03 grams of ethylene diamine, 57.0 grams of the amine-terminated polyether described in Example 2, 5.2 grams of the external emulsifier described in Example 2, and 60.0 grams of demineralized water. The mixture precipitated forming spongy solid material rather than a dispersion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous polyurea dispersion which comprises I) dispersing in water at an NCO:NH equivalent ratio of 0.5:1.0 to 2.0:1.0 a) a polyisocyanate which has an average functionality of 1.5 to 4.0 and an isocyanate content of at least 12% by weight and b) a polyamine component containing i) 30 to 70 mole percent of a polyamine having at least two primary and/or secondary amino groups and a molecular weight of 1000 to 5000 and ii) 30 to 70 mole percent of a polyamine having at least two primary and/or secondary amino groups, a molecular weight of less than 400 and at least one anionic or potential anionic group and

II) allowing the polyisocyanate and polyamine component to react to form an aqueous polyurea dispersion.

2. The process of claim 1 wherein said dispersed polyisocyanate is rendered hydrophilic by reaction with a compound containing a lateral or terminal nonionic hydrophilic group.

3. The process of claim 1 wherein component i) comprises an aminated polyether.

4. The process of claim 2 wherein component i) comprises an aminated polyether.

5. The process of claim 1 wherein either or both of the polyamine components are dispersed in water in the presence of 0.1 to 10% by weight, based on the weight of the polyamine component, of an external emulsifier.

6. The process of claim 1 wherein said polyamine component additionally contains 1 to 25% by weight, based on the weight of components i) and ii), of a polyamine which has a molecular weight of less than 400 and does not contain anionic or potential anionic groups.

7. The process of claim 6 wherein one or more of the polyamine components are dispersed in water in the presence of 0.1 to 10% by weight, based on the weight of the polyamine component, of an external emulsifier.

8. The process of claim 1 wherein said polyisocyanate has an average functionality of 1.5 to 2.5.

9. An aqueous polyurea dispersion which is prepared by a process which comprises I) dispersing in water at an NCO:NH equivalent ratio of 0.5:1.0 to 2.0:1.0
   a) a polyisocyanate which has an average functionality of 1.5 to 4.0 and an isocyanate content of at least 12% by weight and
   b) a polyamine component containing
      i) 30 to 70 mole percent of a polyamine having at least two primary and/or secondary amino groups and a molecular weight of 1000 to 5000 and
      ii) 30 to 70 mole percent of a polyamine having at least two primary and/or secondary amino groups, a molecular weight of less than 400 and at least one anionic or potential anionic group and II) allowing the polyisocyanate and polyamine component to react to form an aqueous polyurea dispersion.

10. The aqueous polyurea dispersion of claim 9 wherein said dispersed polyisocyanate is rendered hydrophilic by reaction with a compound containing a lateral or terminal nonionic hydrophilic group.

11. The aqueous polyurea dispersion of claim 9 wherein component i) comprises an aminated polyether.

12. The aqueous polyurea dispersion of claim 10 wherein component i) comprises an aminated polyether.

13. The aqueous polyurea dispersion of claim 9 wherein either or both of the polyamine components are dispersed in water in the presence of 0.1 to 10% by weight, based on the weight of the polyamine component, of an external emulsifier.

14. The aqueous polyurea dispersion of claim 9 wherein said polyamine component additionally contains 1 to 25% by weight, based on the weight of components i) and ii), of a polyamine which has a molecular weight of less than 400 and does not contain anionic or potential anionic groups.

15. The aqueous polyurea dispersion of claim 14 wherein one or more of the polyamine components are dispersed in water in the presence of 0.1 to 10% by weight, based on the weight of the polyamine component, of an external emulsifier.

16. The aqueous polyurea dispersion of claim 9 wherein said polyisocyanate has an average functionality of 1.5 to 2.5.

* * * * *